United States Patent
Sansom, Jr.

[15] 3,654,436
[45] Apr. 4, 1972

[54] AIR NAVIGATION COMPUTER FOR WINDAGE PROBLEMS

[72] Inventor: Richard E. Sansom, Jr., 843 Alderman Road, Apt. 241, Jacksonville, Fla. 32211

[22] Filed: Oct. 15, 1970

[21] Appl. No.: 80,954

[52] U.S. Cl. .............................................235/78, 235/61 NV
[51] Int. Cl. ..........................................................G06c 27/00
[58] Field of Search ..........................235/78, 88, 61 NV, 84

[56] References Cited

UNITED STATES PATENTS

| | | | |
|---|---|---|---|
| 2,019,708 | 11/1935 | Jones | 235/84 X |
| 2,506,299 | 5/1950 | Isom | 235/61 NV |
| 2,413,314 | 12/1946 | Gruzan | 235/78 |
| 2,901,167 | 8/1959 | Mudge | 235/61 NV |
| 2,967,016 | 1/1961 | Gray | 235/61 NV |

FOREIGN PATENTS OR APPLICATIONS

| | | | |
|---|---|---|---|
| 708,893 | 5/1954 | Great Britain | 235/84 |

*Primary Examiner*—Richard B. Wilkinson
*Assistant Examiner*—Stanley A. Wal
*Attorney*—George H. Baldwin and Arthur G. Yeager

[57] ABSTRACT

A computer including a pair of discs and cursor rotatably connected with a first logarithmic scale representing variations in wind speed on the lower disc and a second logarithmic scale representing variations in air speed on the upper disc. The upper disc includes a window through which is read indicia on the lower disc representing the wind correction angle solutions for each of the various combinations of the first and second logarithmic scales whereby the wind correction angle solution is indexed and read adjacent the appropriate wind angle on the scale of wind angles adjacent such window when an air speed is aligned with a wind speed. The upper member includes another window through which is read indicia on the lower disc representing the ground speed multiple solutions for each of the various combinations of the first and second logarithmic scales whereby the ground speed multiple solution is indexed and read adjacent the appropriate wind angle on the other scale of wind angles adjacent such other window when an air speed is aligned with a wind speed. The cursor includes a logarithmic scale representing variations of ground speed multiples corresponding to indicia solutions on the lower disc, the cursor scale having an index cooperating with a selected air speed on the second logarithmic scale whereby the ground speed is read on the second logarithmic scale adjacent the appropriate ground speed multiple on the cursor.

11 Claims, 8 Drawing Figures

PATENTED APR 4 1972 3,654,436

INVENTOR
Richard E. Sansom, Jr.
BY George H. Baldwin
ATTORNEY

PATENTED APR 4 1972　　3,654,436

INVENTOR
Richard E. Sansom, Jr.
BY
George H. Baldwin
ATTORNEY

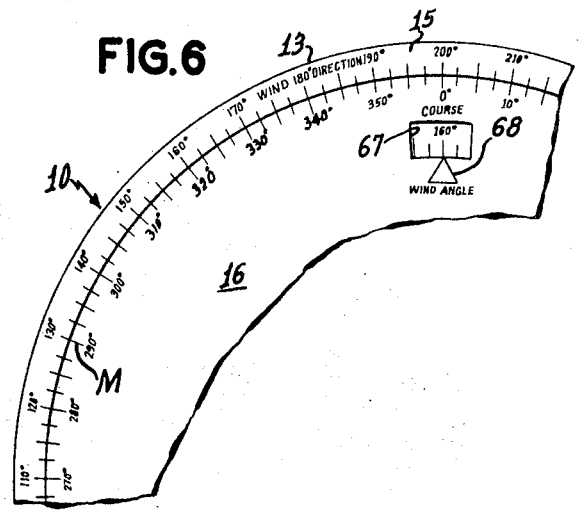
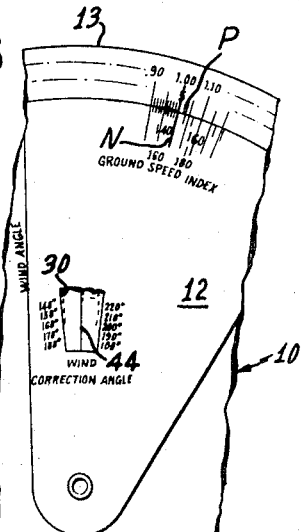
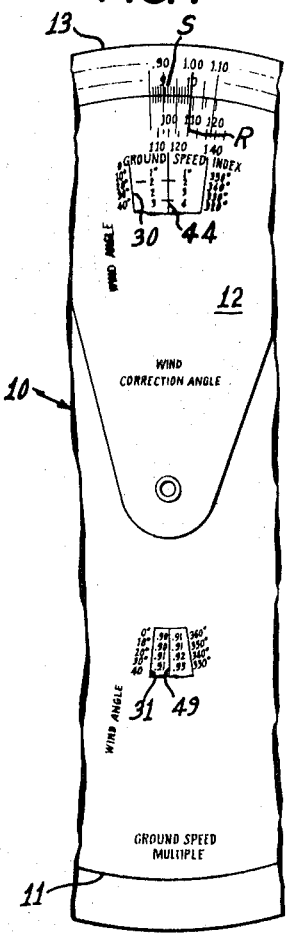
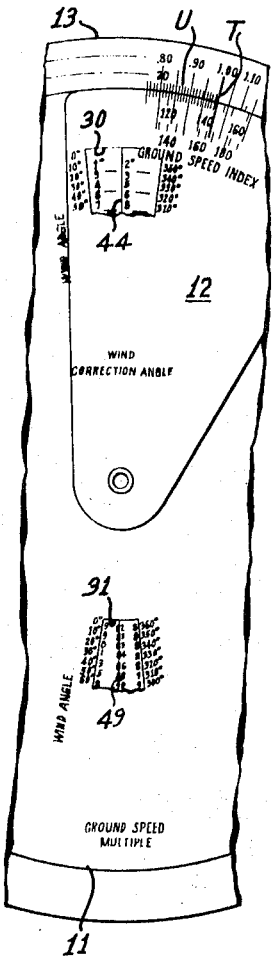

AIR NAVIGATION COMPUTER FOR WINDAGE PROBLEMS

BACKGROUND OF THE INVENTION

1. Field of the Invention

This invention relates to air navigation computers and more particularly to computers for solving windage problems associated with air navigation. While the computer of this invention is shown as solving navigation problems relating to the effect of the movement of air or winds upon the aircraft in flight, the various features thereof may be incorporated as the windage solutions or portions of a more encompassing and general flight computer capable of solving other flight problems.

2. Description of Prior Art

Flight computers of various types and constructions have been previously suggested, but the windage problem solutions for one reason or another have been unsatisfactory since the basic approaches have been the traditional graphic-slide and pencil-mark methods. Exemplary of some of the prior art arrangements are the following U.S. Pat Nos.: 2,339,222; 2,342,674; 2,405,803; 2,528,518; 2,548,319; 2,569,505; 2,623,696; 2,767,919; 3,361,346; 3,471,084; and 3,497,678. Such prior art fails, however, to teach or suggest a flight computer which could be adapted in any obvious manner to achieve the results or perform the functions of the improved air navigation computer as described and claimed herein.

DEFINITIONS AND SUMMARY

The common windage problems involve the following relevant variables which are defined herein: Air speed (the speed or velocity of the aircraft moving through the air); wind speed (the speed or velocity of the air moving relative to the surface of the earth); true course (the track or direction of the progress of the aircraft relative to true north); wind direction (the direction that the air is moving relative to true north); wind angle or scale of angles of wind direction relative to true course (the angular difference between the wind direction and the true course); heading (the direction in which the aircraft is pointed); wind correction angle solutions (the angle of heading needed to compensate for the effects of the winds to maintain the aircraft on true course); ground speed (the speed or velocity of the aircraft relative to the surface of the earth); and ground speed multiple solutions (a multiplying factor of air speed needed to compensate for the effects of the winds to convert air speed into ground speed).

The most frequent occurrences of windage problems in flight planning and flying of an aircraft, present two unknown variables of ground speed and the heading or the wind correction angle needed to compensate for the effect of the reported winds on the aircraft which causes the aircraft to be off of the desired course. Determination of such wind correction angle is obviously necessary and a prediction of ground speed is useful in flight planning in order to determine the estimated time and route to be taken and other related factors such as fuel requirements and destination arrival time. The computer in accord with this invention is primarily for use by non-professional pilots, who perform their own flight planning and navigation, to determine the above two unknown variables. The complexity and difficulty of using contemporary windage computers causes many pilots in actual practice to rely upon rough estimates or trial and error in solving problems of windage navigation. A general object of this invention is to provide an improved computer for solving windage problems. A particular object of this invention is to simplify and speed the process of obtaining the windage solutions, as most frequently practiced in air navigation. Another particular object is to provide a computer which is simply and economically manufactured and sold and durable in construction and use. A specific object is the provision of a compact improved computer of an easily carried size yet accurate in the solutions obtained.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 5 is a partial plan view of the computer showing the solutions obtained in accord with Example A;

FIG. 6 is a partial bottom view of the computer showing a solution obtained in Example A;

FIGS. 7 and 8 are partial plan views similar to FIG. 5 showing solutions of respective Examples B and C.

DESCRIPTION OF THE PREFERRED EMBODIMENT

Figure 1:
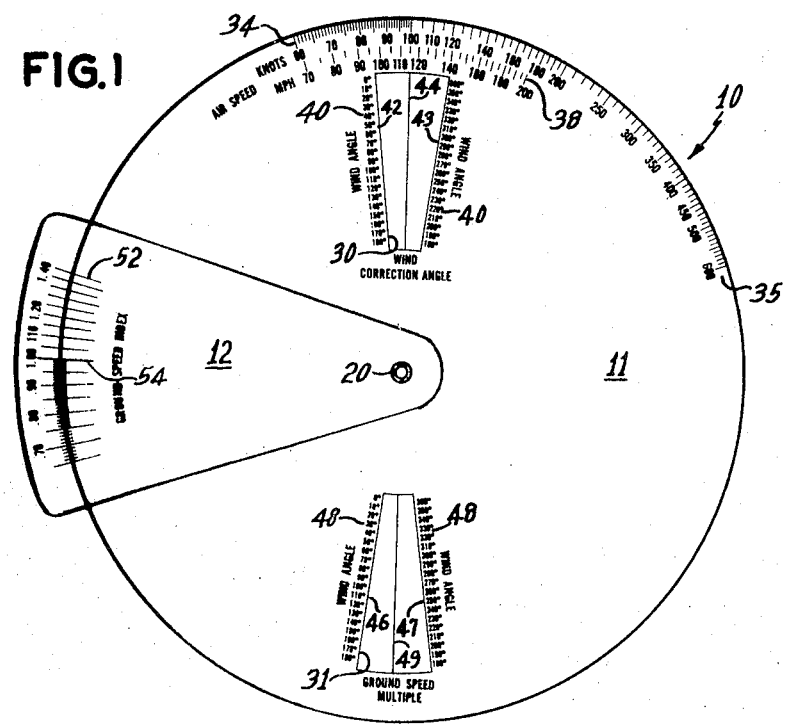
FIG. 1 is a plan view of the top disc member and cursor in accord with this computer invention.
Figure 2:
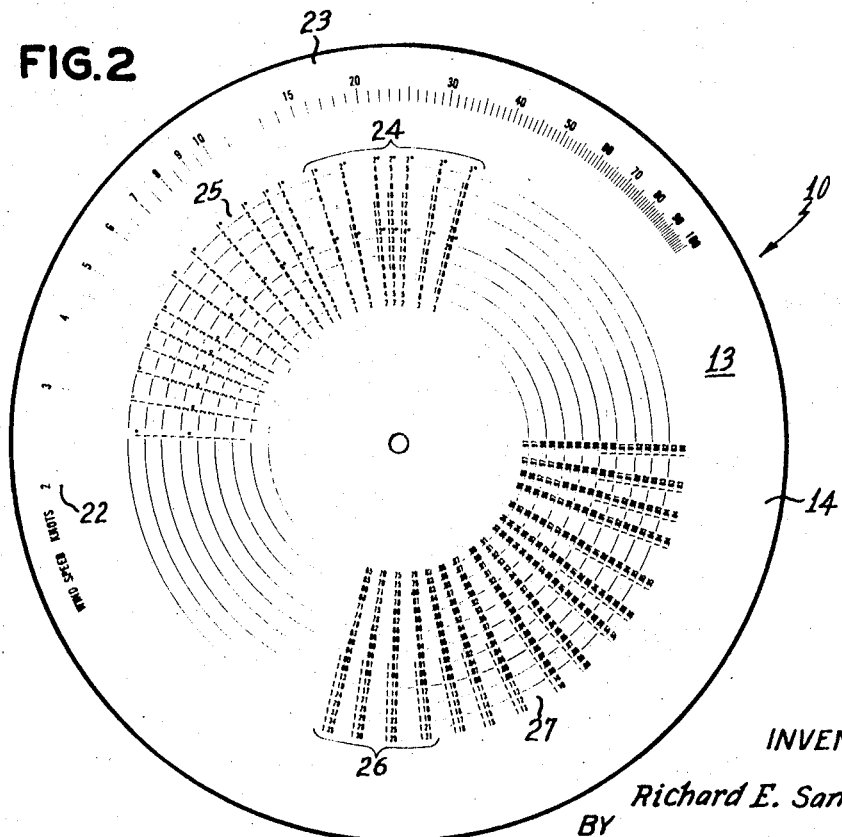
FIG. 2 is a plan view of the front face of the middle disc member of this invention.
Figure 3:
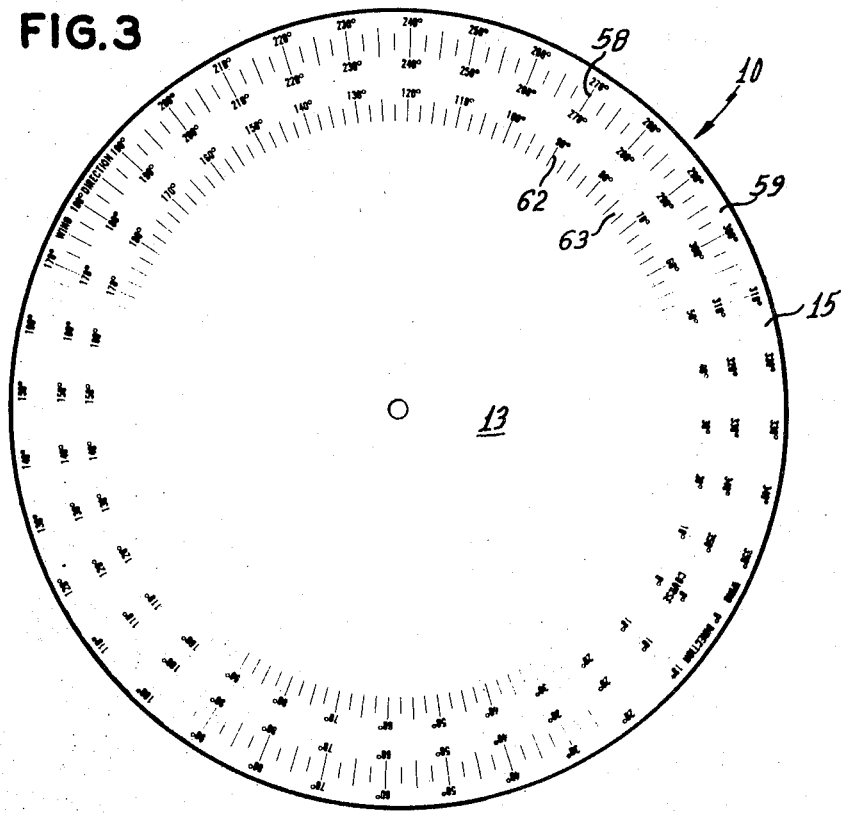
FIG. 3 is a bottom view of the back face of the middle disc member of FIG. 2.
Figure 4:
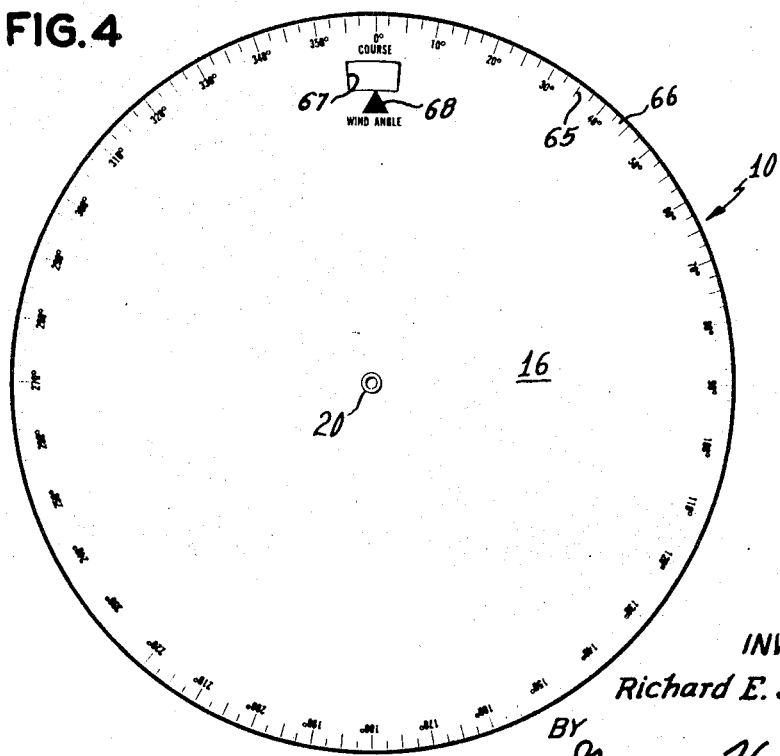
FIG. 4 is a plan view of the bottom disc member.

Referring now more particularly to the drawings of FIGS. 1–4, the computer is generally designated by numeral 10 and includes a top disc member 11 and cursor 12, as seen in FIG. 1, a middle disc member 13 having a front face 14, as shown in FIG. 2, a rear face 15, as shown in FIG. 3, and a bottom disc member 16, as shown in FIG. 4.

Pivot means in the form of a double headed hollow rivet 20 rotatably connects cursor 12 and members 11, 13 and 16 together, in a manner well known in the art. A logarithmic scale 22 representing the wind speed in knots is disposed on and along a circumferential portion 23 of the front face 14 of middle member 13. The wind correction angle indicia solutions 24 are disposed in a radial and column manner on a sector portion 25 of the front face 14 of member 13, which cooperate and come into view beneath flared wind correction angle window 30 of member 11, as hereinafter more particularly described. The ground speed multiple indicia solutions 26 are also disposed in a radial and column manner on another sector portion 27 generally opposite to sector portion 25, solutions 26 cooperating and coming into view beneath flared ground speed multiple window 31 of member 11, as later described.

Top member 11 includes a logarithmic scale 34 representing the air speed of the aircraft in knots disposed on and along a circumferential portion 35 of member 11, and another logarithmic scale 38 of air speed in miles per hour is disposed beneath and corresponds to appropriate values on scale 34. Top member 11 is smaller in radius than member 13 so that the air speed scales 34 and 38 may be selectively aligned with various wind speeds of scale 22 on member 13. A column of wind angles of scale of angles of wind direction relative to true course 40 is disposed along and adjacent the side edges 42 and 43 of elongated window 30, window 30 being flared from adjacent rivet 20 to the outer extent thereof adjacently below scale 38. Window 30 is a clear transparent portion of member 11 to permit the wind correction angle solution 24 to appear therethrough. A hair line 44 is disposed along a radius of member 11 and is located generally medially between window side edges 42 and 43. The angles from 0° to 180° are disposed adjacent side edge 42 and the angles from 180° to 360° are disposed adjacent side edge 43, with the 0° and 360° being opposite each other and the 180° angles similarly being oppositely disposed whereby the reciprocal angles of 180° to 360° are located opposite the angles 0° to 180°. The wind angles 0° to 360° correspond to any relative angle between wind direction and true course and between a direct headwind and a direct tailwind.

The ground speed multiple elongated window 31 is flared from adjacent rivet 20 to the outer extent thereof and includes elongated side edges 46 and 47 with the scales of wind angles 48 being disposed adjacent to and along respective window side edges 46 and 47, identical to wind angles 40 hereinabove described. Window 31 is also transparent to permit the ground speed multiple solutions 26 to appear therethrough and includes a hair line 49 extending along a radius of member 11 generally medially between window side edges 46 and 47.

Cursor 12 is a clear transparent sector shaped member having a logarithmic scale 52 thereon representing variations of ground speed multiple indicia solutions 26 on member 13. Scale 52 includes a heavy index 54 which is appropriately positioned in register with the air speed on either of scales 34 or 38 to convert air speed to ground speed on either of such scales beneath an appropriate ground speed multiple solution obtained from ground speed multiple solutions 26, as will appear more clearly from the examples hereinafter. The numerals on scale 52 are seen to be spaced outwardly and adjacently above the numerals on scale 22 with the indicia lines of scale 52 extending radially at least into the indicia lines of scale 38, as will be apparent from FIG. 5, for example.

The rear face 15 of member 13 is illustrated in FIG. 3 and includes a scale of angles 58 of wind direction from 0° to 360° along the circumferential portion 59 and the solutions 62 of wind angle, i.e., the difference between the wind direction and the true course, are positioned along a ring portion 63 of member 13 spaced inwardly from portion 59. The bottom member 16 is smaller in radius than member 13 so that the true course scale 65 between 0° and 360° is disposed along the circumferential portion 66 for selective alignment of various true course angles of scale 65 with selective wind direction angles of scale 58. A transparent window 67, having an index mark 68 cooperating therewith, permits the appropriate wind angle solution 62 to appear therethrough when the wind angle is subtracted from the true course upon proper relative manipulation of members 13 and 16.

In general the computer is operated as follows: the front member 11 is rotated so that a selected indicia on either of the air speed scales 34 and 38 is indexed below a selected indicia on the wind speed scale 22 on the middle member 13, and the appropriate alternatives in column form of wind correction angle solutions 25 and ground speed multiple solutions 26 for that particular combination of wind speed and air speed will be visible through the respective windows 30 and 31. The hairlines 44 and 49 in the center of respective windows 30 and 31 locates the true series of answers from solutions 25 and 26. The width of the windows 30 and 31 usually show more than one column to facilitate interpolation when a column does not appear directly under the corresponding hairline. The columns of wind angles 40 and 48 on either side edge of the respective windows 30 and 31 function as an index to enable the user to select the appropriate wind correction angle solution and ground speed multiple solution from the column appearing in the respective windows 30 and 31 opposite the wind angle obtained in the windage problem. The wind correction angle is then employed to alter the heading thereby compensating for the effects of the winds on the aircraft to maintain the aircraft on true course. The cursor 12 then is employed to convert the air speed of the aircraft to ground speed by positioning the heavy index 54 of the cursor over the air speed on either of scales 34 or 38 and reading the ground speed (on either of the air speed scales 34 or 38) under the ground speed multiple solution on scale 52 which corresponds to the ground speed multiple solution 26 from the lower window 31.

Consideration of the following examples will be of assistance in further clarifying the operation of the computer in accord with the invention:

Example A. The aircraft is to travel a true course of 290°, the winds being 130° at 5 knots and estimated true air speed being 145 knots. Step (1) Subtracting 130° from 290° results in a wind angle of 160° (by placing 290° under the 130° mark, as shown at M in FIG. 6 on the back of the computer, the answer 160° appears in the wind angle window 67). Step (2) On the front of the computer, the air speed of 145 knots is set beneath the wind speed of 5 knots, as shown at N in FIG. 5. In the wind correction angle window 30 the wind correction angle of 1° will be indexed under the hairline 44 opposite the wind angle of 160°. The Ground Speed Multiple solution, 1.03 will be indexed opposite the wind angle of 160° in the lower window 31 beneath hairline 49. Step (3) The ground speed index scale is then used to convert the air speed to ground speed by moving the cursor so that the heavy line under 1.00 is indexed over the air speed of 145 knots. The approximate ground speed of 150 knots, will be indexed under the 1.03 point on the cursor as shown by P in FIG. 5.

Example B. The aircraft is to travel a true course of 273°. The winds are 300° at 10 knots and the estimated true air speed is 125 mph. Step (1) The wind angle to the nearest 10° is 30° (subtract or use back of computer as in Step (1) of Example A). Step (2) On the front set the air speed 125 mph below the wind speed 10 knots, as shown by R in FIG. 7. The hairline 44 in the upper window 30 opposite the wind angle of 30° will now be indexed between 2° and 3° indicating that the wind correction angle is approximately 2 ½°. In the lower window 31, the hairline 49 will indicate that the ground speed multiple is approximately 0.92 (midway between 0.91 and 0.93) adjacent the 30° wind angle. Step (3) By placing the 1.00 index mark on the cursor over 125 mph, the ground speed 115 mph, will appear beneath the 0.92 mark on the cursor, as shown by S in FIG. 7.

Example C. The intended course is 270°, winds are 315° at 25 knots and air speed is 145 knots. Step (1) Rather than the nearest 10° wind angle, use the actual wind angle of 45° when winds are very high. Step (2) Index the air speed 145 knots on the front under the wind speed 25 knots, as shown by T in FIG. 8. In the upper window 30, a wind correction angle of 6° and 8° are respectively opposite the 40° and 50° wind angles. Interpolating, the wind correction angle would be 7°. In the lower window 31, the actual wind angle 45° is between ground speed multiples of 0.86 and 0.88, thus 0.87 would be approximately correct. Step (3) On the cursor, a ground speed multiple of 0.87 would convert the air speed of 145 knots to a 126-knot ground speed, as shown by U in FIG. 8.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In an air navigation computer for solving windage problems comprising upper and lower relatively movable members, a first logarithmic scale representing variations in wind speed disposed on one of said members, a second logarithmic scale representing variations in air speed disposed on the other of said members for cooperation with said first scale, said upper member having a window therein, a scale of angles of wind direction relative to the true course disposed on said upper member adjacent said window, said lower member having indicia representing the wind correction angle solutions for each of the various combinations of said first and second logarithmic scales whereby said wind correction angle solution is indexed and read adjacent the appropriate angle on said scale of angles when any selected air speed is aligned with any selected wind speed.

2. In the air navigation computer as defined in claim 1 wherein said scale of angles includes angles from 0° to 360°.

3. In the air navigation computer as defined in claim 1 further comprising pivot means for rotatably connecting said members together.

4. In the air navigation computer as defined in claim 1 wherein said window is elongated and includes a pair of long side edges, said scale of angles includes angles from 0° to 180° along one said side edge and from 180° to 360° along the other said side edge with the 0° and 360° angles being oppositely disposed and the 180° angles being oppositely disposed.

5. In the air navigation computer as defined in claim 1 wherein said upper member includes another window therein, another scale of angles of wind direction relative to the true course disposed on said upper member adjacent said other window, said lower member having indicia representing the ground speed multiple solutions for each of the various combinations of said first and second logarithmic scales whereby said ground speed multiple solution is indexed and read adjacent the appropriate angle on said other scale of angles when any selected air speed is aligned with any selected wind speed.

6. In the air navigation computer as defined in claim 5 further comprising a movable cursor, said cursor having a logarithmic scale thereon representing variations of ground speed multiples corresponding to indicia solutions on said lower member, said cursor scale having an index thereon cooperating with the selected air speed on said second logarithmic scale whereby the ground speed is read on said second logarithmic scale adjacent the appropriate ground speed multiple on said cursor obtained from said ground speed multiple solution adjacent the appropriate angle on said other scale of angles.

7. In an air navigation computer for solving windage problems comprising upper and lower relatively movable members, a first logarithmic scale representing variations in wind speed disposed on one of said members, a second logarithmic scale representing variations in air speed disposed on the other of said members for cooperation with said first scale, said upper member having a window therein, a scale of angles of wind direction relative to the true course disposed on said upper member adjacent said window, said lower member having indicia representing the ground speed multiple solutions for each of the various combinations of said first and second logarithmic scales whereby said ground speed multiple solution is indexed and read adjacent the appropriate angle on said scale of angles when any selected air speed is aligned with any selected wind speed.

8. In the air navigation computer as defined in claim 7 further comprising a movable cursor, said cursor having a logarithmic scale thereon representing variations of ground speed multiples corresponding to indicia solutions on said lower member, said cursor scale having an index thereon cooperating with the selected air speed on said second logarithmic scale whereby the ground speed is read on said second logarithmic scale adjacent the appropriate ground speed multiple on said cursor obtained from said ground speed multiple solution adjacent the appropriate angle on said scale of angles.

9. In the air navigation computer as defined in claim 8 further comprising pivot means for rotatably connecting said members and cursor in a freely relative rotational manner.

10. In the air navigation computer as defined in claim 7 wherein said scale of angles includes angles from 0° to 360°.

11. In the air navigation computer as defined in claim 10 wherein said window is elongated and includes a pair of long side edges, the angles from 0° to 180° of said scale of angles being disposed along one said side edge and from 180° to 360° being disposed along the other said side edge with the 0° and 360° angle being oppositely disposed and the 180° angles being oppositely disposed.

* * * * *